(12) United States Patent
Tsai

(10) Patent No.: US 8,612,798 B1
(45) Date of Patent: Dec. 17, 2013

(54) HYBRID DRIVE STORING WRITE DATA IN NON-VOLATILE SEMICONDUCTOR MEMORY IF WRITE VERIFY OF DISK FAILS

(75) Inventor: Chun Sei Tsai, Tustin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 358 days.

(21) Appl. No.: 12/909,624

(22) Filed: Oct. 21, 2010

(51) Int. Cl.
*G06F 11/00* (2006.01)

(52) U.S. Cl.
USPC ........................................ 714/6.13

(58) Field of Classification Search
USPC ........ 714/4.1, 4.11, 6.1, 6.11, 6.12, 6.13, 6.3, 714/13, 42, 54
See application file for complete search history.

(56) References Cited

U.S. PATENT DOCUMENTS

| | | |
|---|---|---|
| 5,333,138 A | 7/1994 | Richards et al. |
| 5,581,785 A | 12/1996 | Nakamura et al. |
| 5,586,291 A | 12/1996 | Lasker et al. |
| 6,044,439 A | 3/2000 | Ballard et al. |
| 6,115,200 A | 9/2000 | Allen et al. |
| 6,275,949 B1 | 8/2001 | Watanabe |
| 6,429,990 B2 | 8/2002 | Serrano et al. |
| 6,661,591 B1 | 12/2003 | Rothberg |
| 6,662,267 B2 | 12/2003 | Stewart |
| 6,687,850 B1 | 2/2004 | Rothberg |
| 6,754,021 B2 | 6/2004 | Kisaka et al. |
| 6,807,630 B2 | 10/2004 | Lay et al. |
| 6,909,574 B2 | 6/2005 | Aikawa et al. |
| 6,968,450 B1 | 11/2005 | Rothberg et al. |
| 7,017,037 B2 | 3/2006 | Fortin et al. |
| 7,028,174 B1 | 4/2006 | Atai-Azimi et al. |
| 7,082,494 B1 | 7/2006 | Thelin et al. |
| 7,107,444 B2 | 9/2006 | Fortin et al. |
| 7,120,806 B1 | 10/2006 | Codilian et al. |
| 7,142,385 B2 | 11/2006 | Shimotono et al. |
| 7,174,478 B2 * | 2/2007 | Asano ........................... 714/6.13 |
| 7,334,082 B2 | 2/2008 | Grover et al. |
| 7,395,452 B2 | 7/2008 | Nicholson et al. |
| 7,411,757 B2 | 8/2008 | Chu et al. |
| 7,461,202 B2 | 12/2008 | Forrer, Jr. et al. |
| 7,472,219 B2 * | 12/2008 | Tamura et al. ................. 711/103 |
| 7,472,222 B2 | 12/2008 | Auerbach et al. |
| 7,477,477 B2 | 1/2009 | Maruchi et al. |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Scott Baderman
*Assistant Examiner* — Joseph Kudirka

(57) ABSTRACT

A hybrid drive is disclosed comprising a head actuated over a disk comprising a plurality of data sectors, a volatile semiconductor memory (VSM), and a non-volatile semiconductor memory (NVSM). A first write command is received from a host, the first write command comprising first data. The first data is stored in the VSM and written to a first data sector on the disk. The first data is read from the first data sector at least once during a first read operation, and when the first read operation fails, the first data is written to the NVSM. The first data sector is read at least once during a second read operation, and when the second read operation fails, the first data sector is mapped out.

16 Claims, 5 Drawing Sheets

(56) References Cited

U.S. PATENT DOCUMENTS

| | | |
|---|---|---|
| 7,509,471 B2 | 3/2009 | Gorobets |
| 7,516,346 B2 | 4/2009 | Pinheiro et al. |
| 7,610,438 B2 | 10/2009 | Lee et al. |
| 7,613,876 B2 | 11/2009 | Bruce et al. |
| 7,644,231 B2 | 1/2010 | Recio et al. |
| 7,685,360 B1 | 3/2010 | Brunnett et al. |
| 7,752,491 B1 | 7/2010 | Liikanen et al. |
| 8,194,340 B1 * | 6/2012 | Boyle et al. ............ 360/48 |
| 8,427,771 B2 | 4/2013 | Tsai |
| 8,429,343 B1 | 4/2013 | Tsai |
| 2006/0195657 A1 | 8/2006 | Tien et al. |
| 2008/0040537 A1 | 2/2008 | Kim |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1 | 9/2008 | Nam et al. |
| 2008/0244188 A1 * | 10/2008 | Yoshida ............ 711/137 |
| 2008/0256287 A1 | 10/2008 | Lee et al. |
| 2008/0307270 A1 | 12/2008 | Li |
| 2009/0019218 A1 | 1/2009 | Sinclair et al. |
| 2009/0031072 A1 | 1/2009 | Sartore |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0182933 A1 | 7/2009 | Jang et al. |
| 2009/0204852 A1 | 8/2009 | Diggs et al. |
| 2009/0249168 A1 | 10/2009 | Inoue |
| 2009/0271562 A1 | 10/2009 | Sinclair |
| 2009/0327603 A1 | 12/2009 | McKean et al. |
| 2010/0088459 A1 | 4/2010 | Arya et al. |

OTHER PUBLICATIONS

Gokul Soundararajan, Vijayan Prabhakaran, Mahesh Balakrishan, TED Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "Sail: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

* cited by examiner

HYBRID DRIVE STORING WRITE DATA IN NON-VOLATILE SEMICONDUCTOR MEMORY IF WRITE VERIFY OF DISK FAILS

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figures 1A, 1B:
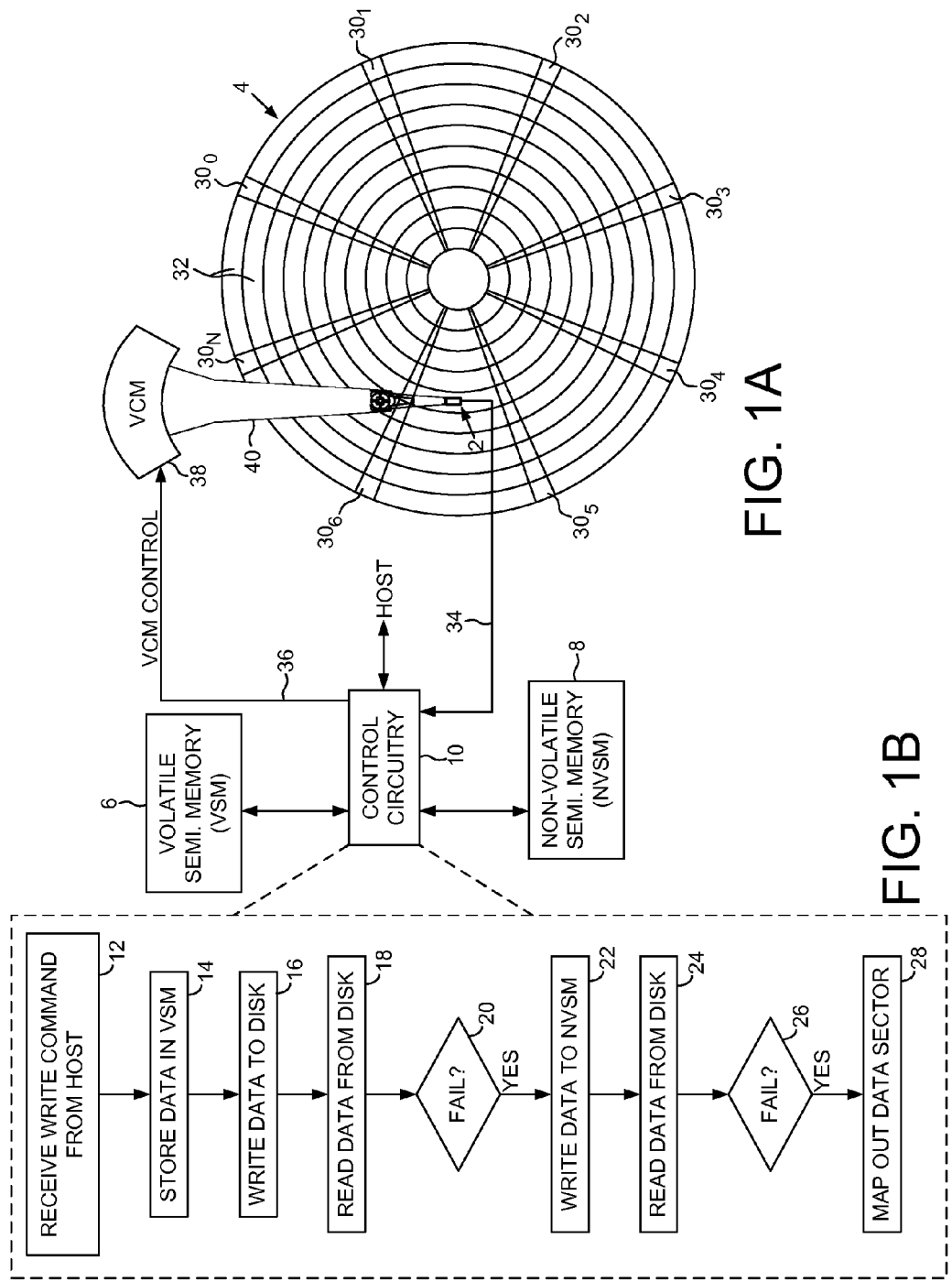
FIG. 1A shows a hybrid drive according to an embodiment of the present invention comprising a head actuated over a disk and a non-volatile semiconductor memory.
FIG. 1B is a flow diagram according to an embodiment of the present invention wherein if a data sector fails a write verify operation, the data is stored in the NVSM to allow additional write verify operations on the data sector.

FIG. 1A shows a hybrid drive according to an embodiment of the present invention comprising a head 2 actuated over a disk 4 comprising a plurality of data sectors, a volatile semiconductor memory (VSM) 6, and a non-volatile semiconductor memory (NVSM) 8. The hybrid drive further comprises control circuitry 10 operable to execute the flow diagram of FIG. 1B wherein a first write command is received from a host (step 12), the first write command comprising first data. The first data is stored in the VSM (step 14) and written to a first data sector on the disk (step 16). The first data is read from the first data sector at least once during a first read operation (step 18), and when the first read operation fails (step 20), the first data is written to the NVSM (step 22). The first data sector is read at least once during a second read operation (step 24), and when the second read operation fails (step 26), the first data sector is mapped out (step 28).

In the embodiment of FIG. 1A, any suitable VSM 6 may be employed, such as a dynamic random access memory (DRAM), and any suitable NVSM 8 may be employed, such as any suitable electrically erasable/programmable memory (e.g., a flash memory). In one embodiment, the NVSM comprises a plurality of blocks, where each block comprises a plurality of memory segments referred to as pages and each page may store one or more data sectors. The blocks are programmed a page at a time, and an entire block is erased in a unitary operation. In one embodiment, a garbage collection operation may be executed on previously written blocks in order to copy valid pages to new blocks (and/or to the disk) so that the previously written blocks may be erased and re-used.

The disk 4 shown in the embodiment of FIG. 1A comprises a plurality of servo sectors $30_0$-$30_N$ that define data tracks 32, where each data track comprises a plurality of the data sectors. The control circuitry 10 processes a read signal 34 emanating from the head 2 to demodulate the servo sectors $30_0$-$30_N$ into a position error signal (PES) representing a position error of the head relative to a target data track. The control circuitry 10 comprises a servo compensator for filtering the PES to generate a control signal 36 applied to a voice coil motor (VCM) 38 that rotates an actuator arm 40 about a pivot in order to actuate the head 2 radially over the disk 4 in a direction that reduces the PES.

In one embodiment, when the data of a write command is received from the host it is cached in the VSM and then written to a data sector on the disk. If the data sector fails the read operation (write verify operation), the data cached in the VSM is stored in the NVSM so that it is recoverable in the event of a power failure. The data may then be evicted from the VSM to free up space for subsequent access commands. This extends the life of the NVSM as compared to a hybrid drive that temporarily caches data of every write command targeted to the disk in the NVSM. That is, the data of a write command targeted to the disk is stored in the NVSM only if the data sector on the disk fails the write verify operation. The data sector may then be evaluated further, for example, by performing retry read operations, or by rewriting and rereading the data sector to determine whether it is truly defective or if the initial write operation failed due to a transient anomaly (e.g., a vibration).

Any suitable condition may be evaluated to determine whether a data sector fails a write verify operation. In one embodiment, a data sector may fail the write verify operation if it is unrecoverable on-the-fly using a suitable error correction code (ECC). In an alternative embodiment, a data sector may fail the write verify operation if a number of correctable ECC errors exceeds a threshold. In the latter embodiment, the data sector may still be considered as failing the write verify operation since any further degradation of the data sector may render it unrecoverable unless the problem is addressed.

Figure 2A:
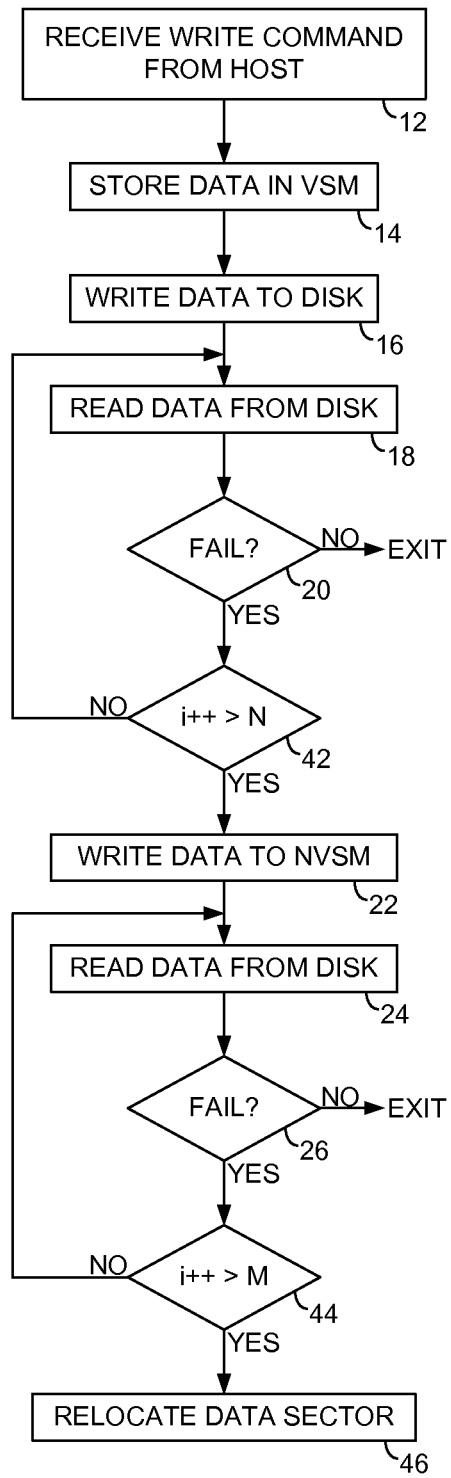
FIG. 2A is a flow diagram according to an embodiment of the present invention wherein a data sector is read N times during a first write verify operation and read M times during a second write verify operation wherein M is greater than N.

FIG. 2A is a flow diagram according to an embodiment of the present invention wherein during a first write verify operation a written data sector is read at least N times (step 42) in an attempt to recover the data sector. If the data sector remains unrecoverable after N retry operations, the data cached in the VSM is stored in the NVSM (step 22). A second write verify operation is then executed wherein the data sector is read up to an additional M times (step 44) in an attempt to recover the data sector. In one embodiment, the first N number of retry reads is significantly less than the second M number of retry reads. For example, in one embodiment a data sector may be read one or two times during the first write verify operation. If the first write verify operation fails, the data is stored in the NVSM and the host notified that the write operation completed successfully. Then at a later time (e.g., during an idle mode) the suspect data sector may be evaluated by executing the second write verify operation wherein the data sector may be read several times (M times) to determine whether it is truly defective.

In the embodiment of FIG. 2A, if a data sector fails the second write verify operation, the data sector is relocated to a spare data sector (step 46) by mapping a corresponding logical block address (LBA) to a physical block address (PBA) of the spare data sector so that the spare data sector is written when a subsequent write command for the LBA is received. In another embodiment, a dynamic LBA mapping scheme is employed wherein LBAs are mapped to PBAs during each write operation, and a data sector is mapped out by simply retiring the corresponding PBA assigned to the data sector.

Figure 2B:
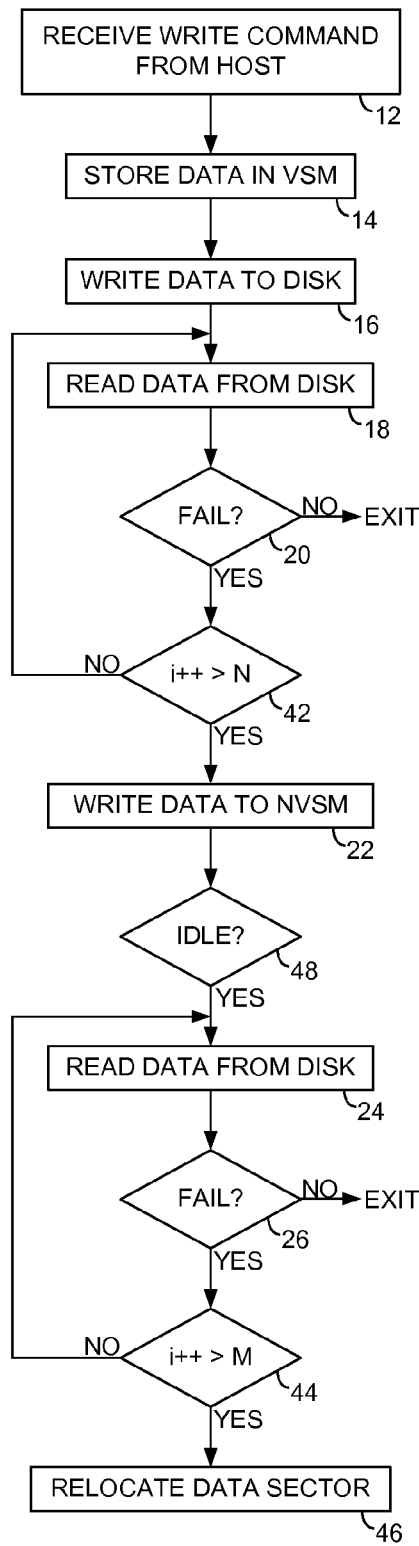
FIG. 2B is a flow diagram according to an embodiment of the present invention wherein a second write verify operation is executed on a data sector during an idle mode of the hybrid drive.

FIG. 2B is a flow diagram according to an embodiment of the present invention wherein when the first write verify operation fails and the data is stored in the NVSM (step 22), the second write verify operation is not executed on the data sector until the hybrid drive enters an idle mode (step 48). The second write verify operation can be deferred as long as needed since the data stored in the NVSM is protected against power failures.

Figure 3:
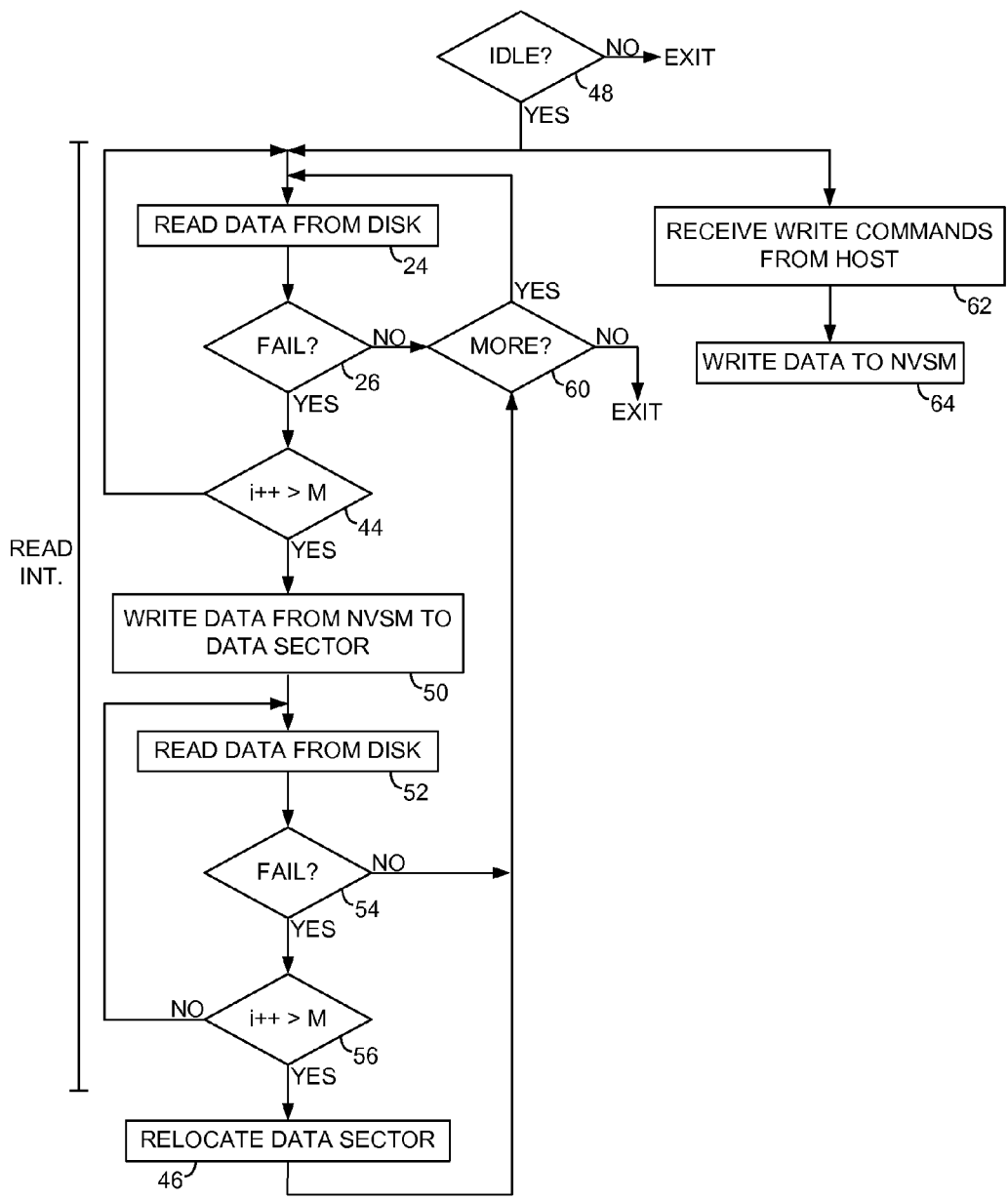
FIG. 3 is a flow diagram according to an embodiment of the present invention wherein write commands are serviced by the NVSM while write verifying a data sector on the disk.

FIG. 3 shows an embodiment of the present invention wherein the LBAs for a number of data sectors that fail the first write verify operation are stored in a list (as well as the corresponding data being stored in the NVSM). During an idle mode of the hybrid drive (step 48), the list of LBAs that failed the first write verify operation are evaluated during a second write verify operation. If a data sector fails the read operation a first M times (step 44), the corresponding data stored in the NVSM is read and written to the data sector (step 50). The data sector is read again (step 52) to determine whether it is still unrecoverable (step 54); that is, whether the previous write operation failed due to a transient anomaly (e.g., a vibration). If the data sector is still unrecoverable after M retries (step 56), it is considered defective and the data sector is relocated (step 46). The process is then repeated starting at step 24 until all of the LBAs in the list have been processed (step 60).

In the embodiment of FIG. 3, when a write command is received (step 62) while write verifying the list of LBAs, the write command is serviced by writing the data to the NVSM (step 64). In this embodiment, a write verify operation of disk data sectors need not be interrupted by a new write command received from the host. FIG. 3 illustrates that the write verify operation may need to be interrupted if a read command is received to read data from the disk that is not stored in the NVSM.

Figure 4A:
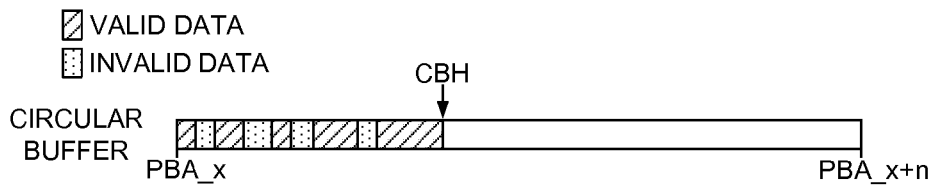
FIG. 4A illustrates an embodiment of the present invention wherein logical block addresses (LBAs) are dynamically mapped to the data sectors at the head of a circular buffer on the disk.

In one embodiment, the LBAs are dynamically mapped to the PBAs of the disk data sectors during each write operation targeted to the disk. FIG. 4A shows an embodiment of dynamic LBA mapping wherein the disk comprises at least one circular buffer. When a write command is received, the LBAs of the write command are mapped to the PBAs at the head of the circular buffer (CBH). When a subsequent write command with a repeated LBA is received, the data is written to the PBA at the head of the circular buffer and the previously written data in the PBA toward the tail of the circular buffer are invalidated. Eventually the head of the circular buffer wraps around to the tail and the invalid data sectors are overwritten with new data. A garbage collection operation may be executed to relocate valid data in data sectors at the tail of the circular buffer to the head of the circular buffer so that the data sectors at the tail may be overwritten as a consecutive sequence.

Figure 4B:
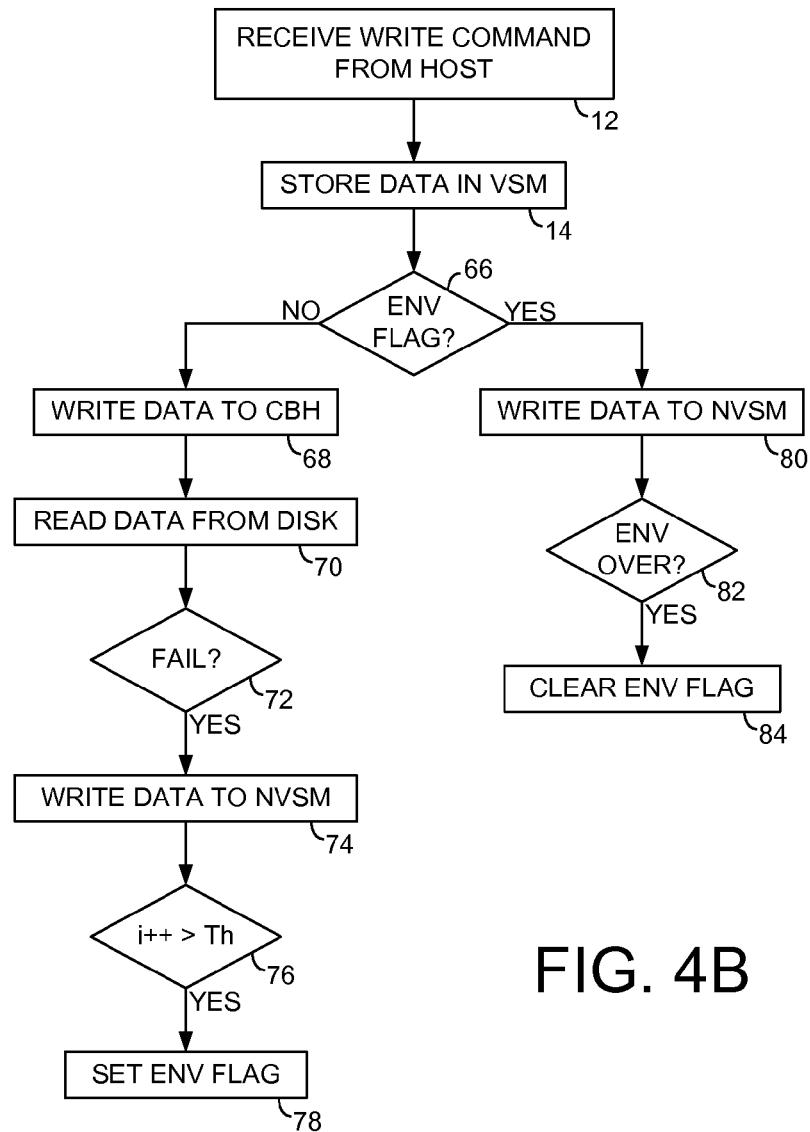
FIG. 4B is a flow diagram according to an embodiment of the present invention wherein an environmental condition (e.g., vibration or high temperature) is detected when a number of data sectors fail a write verify operation, and after detecting the environmental condition, write commands are serviced by the NVSM until the environmental condition passes.

In one embodiment, an environmental condition (e.g., a vibration or high temperature) may adversely affect write operations to the head of the circular buffer shown in FIG. 4A. Accordingly, in one embodiment when a number of consecutive data sectors fail the write verify operation a flag is set and subsequent write operations are serviced by the NVSM. This embodiment is illustrated in the flow diagram of FIG. 4B wherein when a write command is received from the host (step 12) and the data is stored in the VSM (step 14), an environmental flag is evaluated (step 66). If the environmental flag is not set, then the data is written to the head of the circular buffer (step 68) and then read (step 70) during a write verify operation. If a data sector fails the write verify operation (step 72), the data is written to the NVSM (step 74) and a counter is incremented (step 76). If a number of consecutive data sectors fail the write verify operation (step 76), a detrimental environmental condition is assumed and an environmental flag is set (step 78). When subsequent write commands are received and the environmental flag is set (step 66), the write commands targeted to the disk are serviced by writing the data to the NVSM (step 80). When the environmental condition passes (step 82), the environmental flag is cleared (step 84) so that subsequent write commands can be serviced by the disk. The environmental flag may be cleared using any suitable technique, such as after a predetermined interval or after an environmental sensor indicates the environmental condition has passed.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
 a disk comprising a plurality of data sectors;
 a head actuated over the disk;
 a volatile semiconductor memory (VSM);
 a non-volatile semiconductor memory (NVSM); and
 control circuitry operable to:
  receive a first write command from a host, the first write command comprising first data;

store the first data in the VSM;
write the first data to a first data sector on the disk;
read the first data from the first data sector at least once during a first read operation;
when the first read operation fails, write the first data to the NVSM;
after writing the first data to the NVSM, read the first data from the first data sector at least once during a second read operation;
when the second read operation fails, map out the first data sector;
dynamically map a logical block address (LBA) associated with the first data to a physical block address (PBA) of the first data sector at a head of a circular buffer on the disk;
when the first read operation fails, set an environment flag; and
when the environment flag is set, service write commands received from the host using the NVSM.

2. The hybrid drive as recited in claim 1, wherein the control circuitry is further operable to read the first data from the first data sector at least twice during the first read operation.

3. The hybrid drive as recited in claim 1, wherein the control circuitry is further operable to read the first data from the first data sector at least twice during the second read operation.

4. The hybrid drive as recited in claim 1, wherein the control circuitry is further operable to:
read the first data from the first data sector N times during the first read operation; and
read the first data from the first data sector M times during the second read operation, where M is greater than N.

5. The hybrid drive as recited in claim 1, wherein the control circuitry is further operable to:
map a logical block address (LBA) associated with the first data to a physical block address (PBA) of the first data sector; and
map out the first data sector by mapping the LBA to a PBA of a second data sector.

6. The hybrid drive as recited in claim 1, wherein the control circuitry is further operable to:
receive a second write command from the host during at least one of the first and second read operations, the second write command comprising second data; and
write the second data to the NVSM to avoid interrupting the first and second read operations.

7. A method of operating a hybrid drive comprising a head actuated over a disk comprising a plurality of data sectors, a volatile semiconductor memory (VSM), and a non-volatile semiconductor memory (NVSM), the method comprising:
receiving a first write command from a host, the first write command comprising first data;
storing the first data in the VSM;
writing the first data to a first data sector on the disk;
reading the first data from the first data sector at least once during a first read operation;
when the first read operation fails, writing the first data to the NVSM;
after writing the first data to the NVSM, reading the first data from the first data sector at least once during a second read operation; and
when the second read operation fails, mapping out the first data sector;
dynamically mapping a logical block address (LBA) associated with the first data to a physical block address (PBA) of the first data sector at a head of a circular buffer on the disk;
when the first read operation fails, setting an environment flag; and
when the environment flag is set, servicing write commands received from the host using the NVSM.

8. The method as recited in claim 7, further comprising reading the first data from the first data sector at least twice during the first read operation.

9. The method as recited in claim 7, further comprising reading the first data from the first data sector at least twice during the second read operation.

10. The method as recited in claim 7, further comprising:
reading the first data from the first data sector N times during the first read operation; and
reading the first data from the first data sector M times during the second read operation, where M is greater than N.

11. The method as recited in claim 7, further comprising:
mapping a logical block address (LBA) associated with the first data to a physical block address (PBA) of the first data sector; and
mapping out the first data sector by mapping the LBA to a PBA of a second data sector.

12. The method as recited in claim 7, further comprising:
receiving a second write command from the host during at least one of the first and second read operations, the second write command comprising second data; and
writing the second data to the NVSM to avoid interrupting the first and second read operations.

13. A hybrid drive comprising:
a disk comprising a plurality of data sectors;
a head actuated over the disk;
a non-volatile semiconductor memory (NVSM); and
control circuitry operable to:
write first data to a first data sector on the disk;
write second data to a second data sector on the disk;
first read the first data from the first data sector;
second read the second data from the second data sector;
when both the first and second read fail, set an environmental flag; and
when the environment flag is set, bypass the disk and service write commands received from a host using the NVSM.

14. The hybrid drive as recited in claim 13, wherein the control circuitry is further operable to dynamically map a first logical block address (LBA) associated with the first data to a physical block address (PBA) of the first data sector and dynamically map a second LBA associated with the second data to a second PBA of the second data sector.

15. A method of operating a hybrid drive comprising a head actuated over a disk comprising a plurality of data sectors, and a non-volatile semiconductor memory (NVSM), the method comprising:
writing first data to a first data sector on the disk;
writing second data to a second data sector on the disk;
first reading the first data from the first data sector;
second reading the second data from the second data sector;
when both the first and second read fail, setting an environmental flag; and
when the environment flag is set, bypassing the disk and servicing write commands received from a host using the NVSM.

16. The method as recited in claim 15, further comprising dynamically mapping a first logical block address (LBA) associated with the first data to a physical block address (PBA) of the first data sector and dynamically map a second LBA associated with the second data to a second PBA of the second data sector.

* * * * *